(12) United States Patent
Castiglione et al.

(10) Patent No.: US 7,823,292 B1
(45) Date of Patent: Nov. 2, 2010

(54) CUTTER FOR PIZZA AND OTHER FOODS

(76) Inventors: Roberto Castiglione, 328 Martingale Cir., Coatesville, PA (US) 19320; Travis Castiglione, 328 Martingale Cir., Coatesville, PA (US) 19320

(*) Notice: Subject to any disclaimer, the term of this patent is extended or adjusted under 35 U.S.C. 154(b) by 198 days.

(21) Appl. No.: 11/498,490

(22) Filed: Aug. 3, 2006

(51) Int. Cl.
 *B26B 3/00* (2006.01)
(52) U.S. Cl. .................... 30/299; 30/306; 30/307
(58) Field of Classification Search ............ 30/292, 30/306, 307, 319, 365, 287, 299; D7/694; D3/18; D8/98
 See application file for complete search history.

(56) References Cited

U.S. PATENT DOCUMENTS

| | | | | |
|---|---|---|---|---|
| 278,103 | A * | 5/1883 | Curtis | 30/307 |
| 482,830 | A * | 9/1892 | Morgan | 30/319 |
| 552,267 | A * | 12/1895 | Westphalin | 30/292 |
| 677,337 | A * | 7/1901 | Cameron | 30/307 |
| 881,828 | A * | 3/1908 | Schmit | 30/369 |
| 895,969 | A * | 8/1908 | Coyle | 30/307 |
| 900,300 | A * | 10/1908 | Nicolas | 30/319 |
| 1,165,022 | A * | 12/1915 | Rice | 30/319 |
| 1,232,398 | A * | 7/1917 | Sheldon | 30/292 |
| 1,321,215 | A * | 11/1919 | Kollar | 30/319 |
| D149,551 | S * | 5/1948 | Gruber | D7/694 |
| 2,947,084 | A * | 8/1960 | Billings | 33/32.2 |
| D200,335 | S * | 2/1965 | Larson | 30/319 |
| D235,704 | S * | 7/1975 | Tyroler | D3/18 |
| 4,155,142 | A * | 5/1979 | Demetriadis | 15/236.06 |
| D260,223 | S * | 8/1981 | De Coster | D7/694 |
| 4,423,551 | A | 1/1984 | Chmela et al. | 30/142 |
| 4,738,028 | A | 4/1988 | Belokin et al. | 30/319 |
| 4,809,437 | A * | 3/1989 | Saliaris | 30/319 |
| 4,936,466 | A * | 6/1990 | Nava | 211/85.2 |
| 4,993,157 | A * | 2/1991 | Wang | 30/307 |
| 5,297,010 | A * | 3/1994 | Camarota et al. | 340/434 |

(Continued)

FOREIGN PATENT DOCUMENTS

JP 52028782 A * 3/1977

(Continued)

OTHER PUBLICATIONS

"WMF Profi Plus Stainless Steel Double Wheel Cutter"; www.Amazon.com; pp. 1-4; Mar. 20, 2006.

(Continued)

*Primary Examiner*—Jason Daniel Prone
(74) *Attorney, Agent, or Firm*—Petock & Petock, LLC; Michael F. Petock

(57) ABSTRACT

A cutter for cutting pizza and other foods comprising a pair of rotatable cutting wheels mounted on the ends of a substantially C-shaped handle. The cutting wheels are spaced such that the centers are a predetermined distance apart equal to one half of the length of the food item to be cut. By positioning one wheel in the center of the pizza and one wheel at the edge of the pizza, a complete cut of the pizza may be made by moving the cutter one half of the span of the pizza. The cutter in this position may be used with the lower arm of the user substantially vertical wherein the shoulder and body weight of the cutter may be used directly to press down on the cutter. The cutter may also be used in a vertical position using a single cutting wheel. In either position, the cutter provides improve ergonomics.

16 Claims, 3 Drawing Sheets

U.S. PATENT DOCUMENTS

| | | | | |
|---|---|---|---|---|
| D350,462 S * | 9/1994 | La Gro | .......... | D7/694 |
| D354,887 S * | 1/1995 | Hawkins | .......... | D7/694 |
| 5,428,898 A | 7/1995 | Hawkins | .......... | 30/295 |
| 5,469,622 A | 11/1995 | Gradoni | .......... | 30/146 |
| 5,504,998 A * | 4/1996 | Nguyen | .......... | 30/319 |
| 5,555,625 A | 9/1996 | Scheminger | .......... | 30/319 |
| 5,860,217 A * | 1/1999 | Braun | .......... | 30/310 |
| 6,044,565 A * | 4/2000 | Arend et al. | .......... | 30/319 |
| D430,475 S * | 9/2000 | Hirai | .......... | D8/98 |
| D433,912 S * | 11/2000 | Kellander et al. | .......... | D8/98 |
| 6,226,824 B1 | 5/2001 | Hopson et al. | .......... | 7/158 |
| 6,484,407 B2 * | 11/2002 | Khatchadourian et al. | .... | 30/319 |
| D479,098 S * | 9/2003 | Ancona | .......... | D7/601 |
| 6,955,110 B1 | 10/2005 | Spletzer et al. | .......... | 83/672 |
| D614,925 S * | 5/2010 | Blum | .......... | D7/694 |
| 2002/0129499 A1 | 9/2002 | Khatchadourian et al. | .... | 30/319 |
| 2004/0231475 A1* | 11/2004 | Cornfield et al. | .......... | 30/319 |
| 2009/0271993 A1* | 11/2009 | Semprini | .......... | 30/292 |

OTHER PUBLICATIONS

Deposits Published Under the 1960 Act; www.WIPO.int; p. 18 of 36; Mar. 21, 2006.

* cited by examiner

CUTTER FOR PIZZA AND OTHER FOODS

FIELD OF THE INVENTION

The present invention relates to a cutter for pizza and other foods. More particularly, the present invention relates to a cutter for pizza and other foods having a pair of spaced cutting wheels spaced a distance equal to one half of the length of the food item to be cut and connected together by a C-shaped handle structure which provides enhanced ergonomics when using a single cutting wheel or both cutting wheels of the cutter.

BACKGROUND OF THE INVENTION

Millions of pizzas are baked, cut and consumed in the United States alone each year. Many of these are baked in pizzerias and are cut by the workers at the pizzeria. Others are made at home and are cut by the consumer in the home.

The standard pizza cutter is a single wheel mounted on a straight handle. This pizza wheel needs to be run the entire length of the pizza to be cut, or if used for cutting another food item, the entire length of the other food item. Since it is a single wheel cutter, there may be difficulty in tracking. The ergonomics of the standard pizza cutter are poor in that it is a single handle which is usually held at approximately a 45 degree angle to the pizza being cut with the need to apply a downward pressure. This is hard on the hand, wrist and forearm.

SUMMARY OF THE INVENTION

One advantage of the present invention is that it provides a cutting device which may be used for cutting pizzas and other foods in which the length of travel is reduced to one half the length of the cut to be made in the food item.

Another advantage of the present invention is that it provides improved ergonomics in that a downward pressure may be applied to both cutting wheels uniformly and evenly and by having the hand, wrist and forearm vertically aligned to apply the pressure directly in a downward direction, applying the force of the cutting wheels directly to the food items, such as pizza being cut.

Another advantage of the present invention is that it may be used as a cutting device using a single cutting wheel with the handle portion being substantially vertical.

Briefly and basically, in accordance with the present invention, a cutting device is provided which comprises a first and second cutting wheel mounted for rotatable movement. The cutting device includes a substantially C-shaped handle structure having a first and a second end with the first wheel mounted at the first end of the C-shaped handle structure and the second cutting wheel mounted at the second end of the C-shaped handle structure with the center of the first wheel and the center of the second wheel being spaced a distance equal to one half of the length of the food item to be cut.

Although the cutting device of the present invention may be utilized for cutting various food items, it is particularly adapted for use as a pizza cutter. When used as a pizza cutter, the cutter is adapted to be positioned with one wheel in the center of the pizza and one wheel at the edge of the pizza wherein a complete cut of the pizza may be made by moving the cutter one half of the span of the pizza.

In accordance with the present invention, the substantially C-shaped structure faces downward with the center of the C-shaped structure being substantially horizontal wherein pressure may be applied in a downward manner on the handle for the cutting of the pizza with the hand, wrist and user aligned in a substantially vertical direction.

In accordance with the present invention, the C-shaped structure may be positioned substantially vertically wherein the food item may be cut using one of the wheels with the handle being substantially vertical so that the forearm of the cutter is substantially horizontal when the food item is being cut on a horizontal surface.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 3 is a view in perspective, partially broken away of a cutting device in accordance with the present invention being stored in a storage device wherein it is shown that the container portion of the storage device is removable for cleaning and the like.

FIG. 4 is a view in perspective of another embodiment of a storage device wherein a vertical member with a receiving means for the handle of the cutting device may be removed for cleaning or the like.

DETAILED DESCRIPTION OF THE PREFERRED EMBODIMENTS

Figures 1, 2:
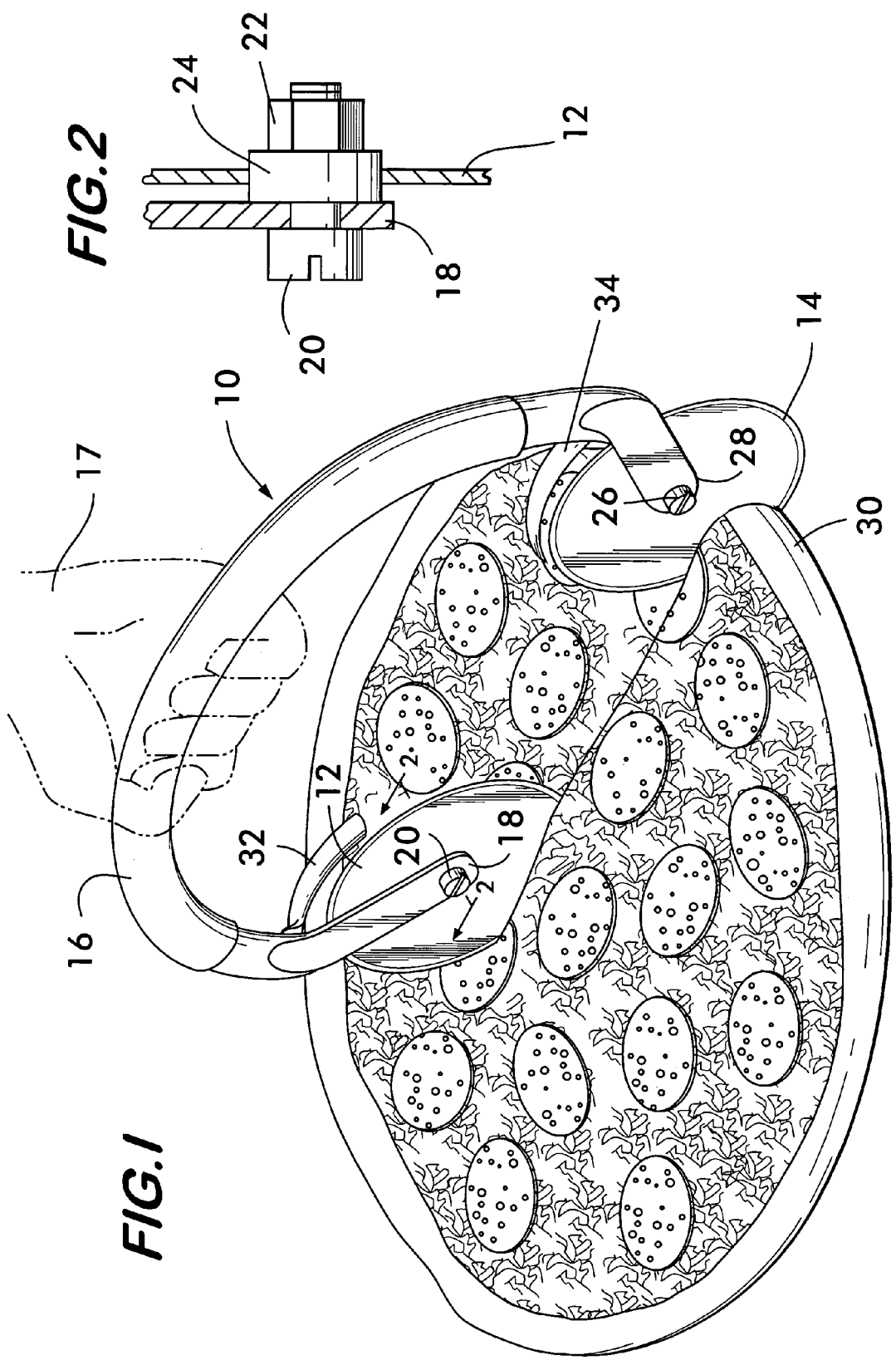
FIG. 1 is a view in perspective of a cutting device in accordance with the present invention being utilized to cut a pizza.
FIG. 2 is a partially broken away cross sectional view taken along line 2-2 of FIG. 1.

Referring now to the drawings in detail, wherein like numerals indicate like elements, there is shown in FIG. 1 a cutting device 10 having a first cutting wheel 12 mounted for rotatable movement and a second cutting wheel 14 mounted for rotatable movement. Substantially C-shaped handle 16 is provided with a first end 18 on which first wheel 12 is pivotally mounted for rotatable movement by removable bolt and nut 20 and 22 as best seen in the cross sectional view of FIG. 2. Wheel 12 is mounted on a bushing or bearing 24. Second wheel 14 is similarly mounted at second end 28 by bolt 26.

As may be seen from FIG. 1, the pressure may be applied downwardly through a vertically lower arm 17 of the person applying the pressure of his shoulder and body weight to cut the pizza instead of manually trying to use his arm at a 45 degree angle.

As may be illustrated in FIG. 1, when the center of the cutting wheels are positioned on the ends of C-shaped handle 16 such that one wheel is at the edge of the pizza 30, such as wheel 14, and the center of the other wheel 12 is at the center of the pizza, the entire pizza may be cut by the movement of cutting device 10 only one half the distance of pizza 30. Of course, cutting device 10 may be utilized to cut various other types of foods.

Cutting device 10 is also provided with fenders or guards 32 and 34 which prevent the user's hand or fingers from accidently being cut by cutting wheels 12 and 14.

Cutting device 10 may also be utilized with the forearm in the horizontal position by holding C-shaped member substantially vertically or in the normal position of a normal C. In this manner, only one wheel would be used for cutting, but the lower arm of the user would be substantially horizontal or substantially parallel to the top of the table or pizza being cut.

Figure 3:
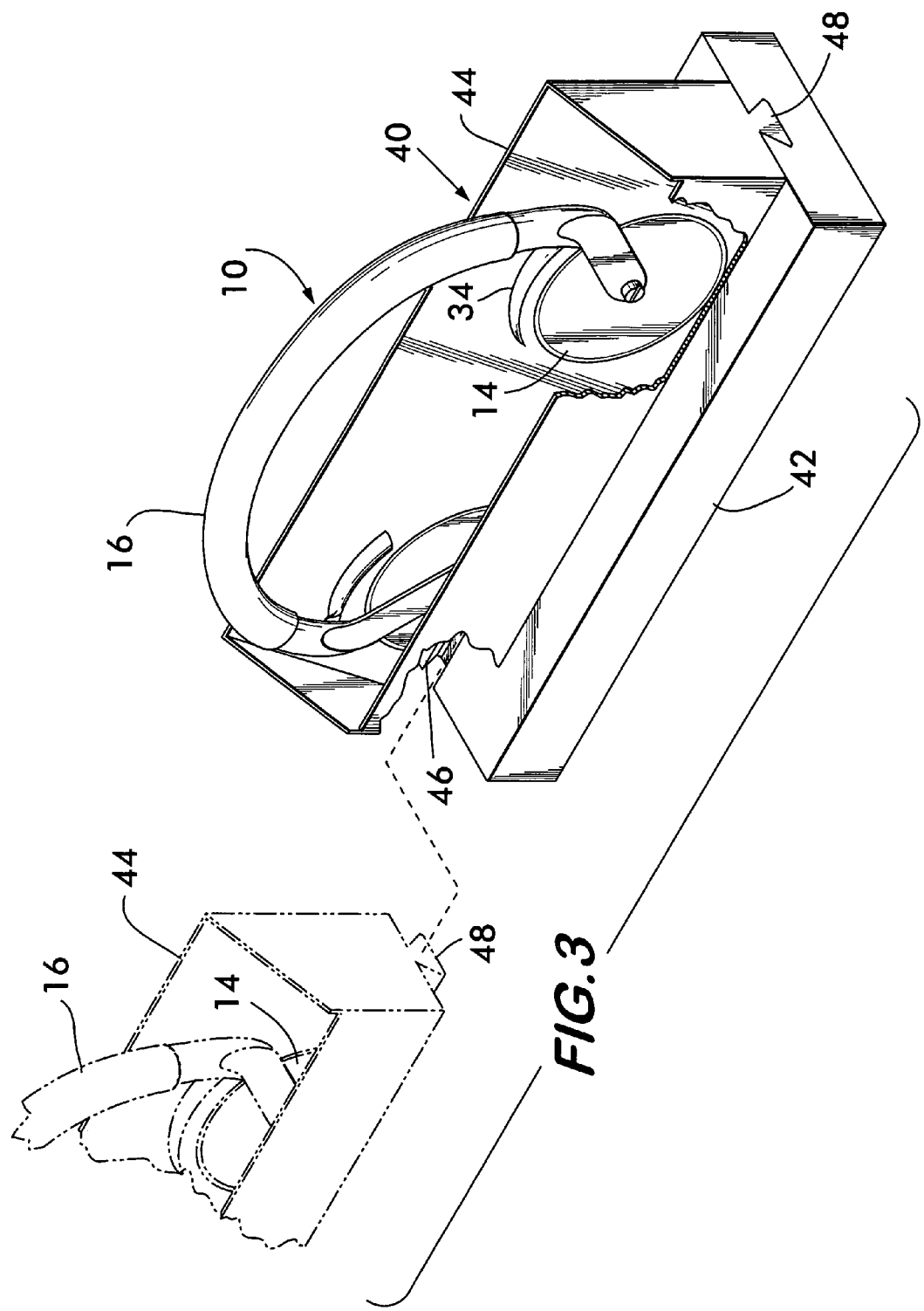

Referring now to FIG. 3, there is shown a storage apparatus 40 which includes a base 42 and a removeably mounted container 44 for receiving at least a portion of the first and second cutting wheels 12 and 14. Base 42 may be comprised of any suitable material, but preferably a heavy rigid material such as granite, marble, plastic or plastic impregnated with heavy material such as sand or the like may be utilized. Base 42 is preferably provided with a groove 46 into which a mating projection on container 44 may be slidably removeably mounted therein. In a presently preferred embodiment, projection 48 may be a dove tail in cross section which slidably mounts into a mating dove tail groove 46. However, it is understood that any other suitable mating groove and projection may be utilized in practicing the present invention.

As illustrated in FIG. 3, container 44 may easily be removeably slidably removed from base 42 for washing, cleaning or other reasons. It is presently preferred that container 44 may be comprised of stainless steel and may be readily removed from base 42 and inserted into a dishwasher for washing and cleaning. However, container 44 may be comprised of other suitable materials including plastics and the like.

Figure 4:
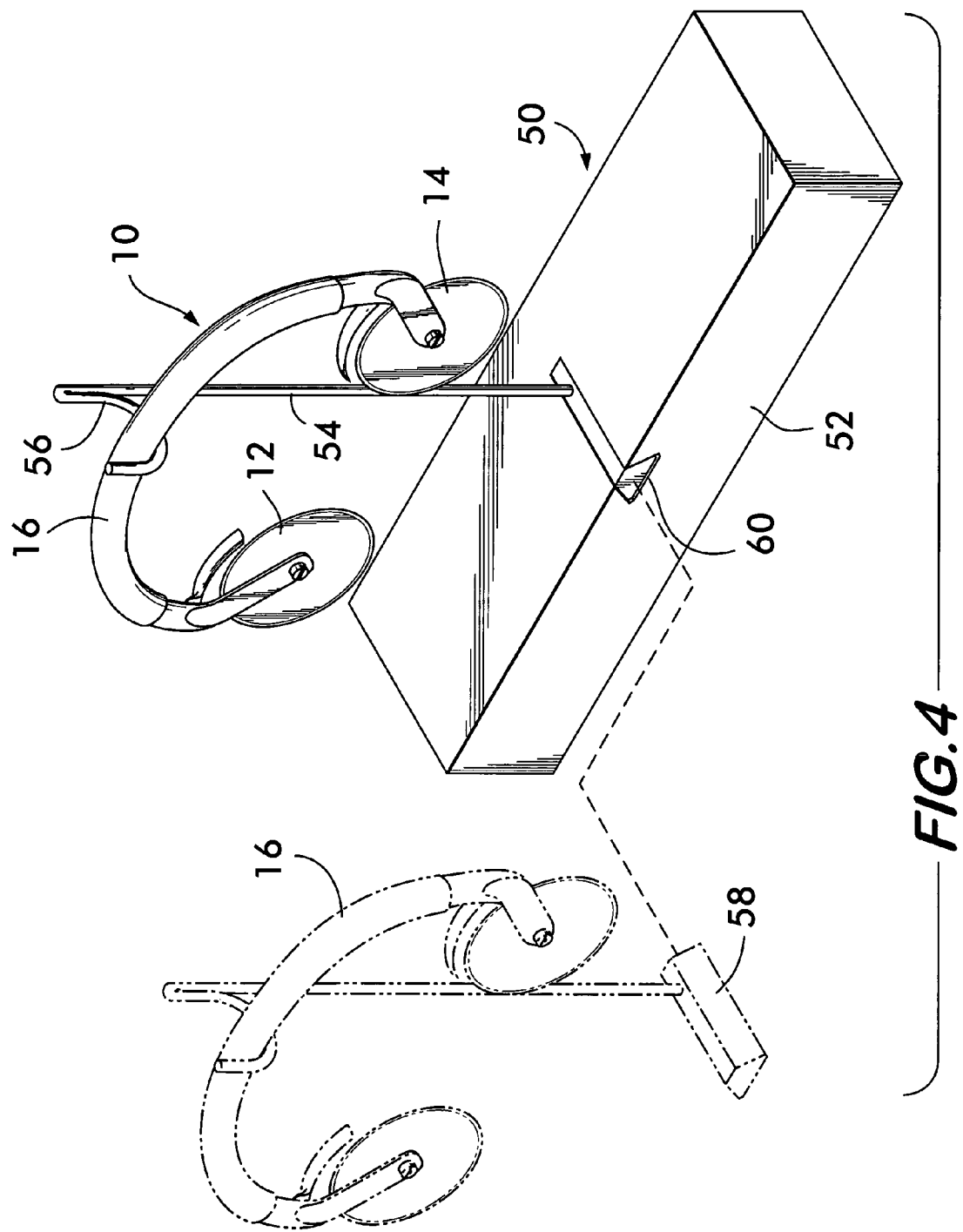

Referring now to FIG. 4, there is shown another embodiment of a storage apparatus 50. Storage apparatus 50 includes a base 52 and a removeably mounted substantially vertical member 54 having a receiving means 56 for receiving the substantially C-shaped handle 16 of cutter 10. Receiving means 56 may preferably be in the shape of a U or hook for receiving handle 16. Substantially vertical member 54 is mounted to a member 58 which is slidably mountable within a groove 60 formed in base 52. The storage apparatus of FIG. 4 may preferably be a consumer oriented storage apparatus. However, the storage apparatus of either FIG. 3 or FIG. 4 may be used with either business pizzerias or for consumers. As with the embodiment of FIG. 3, base 52 may preferably be comprised of a heavier material such as granite, other stone, heavy plastic or weighted plastic. As illustrated in FIG. 4, member 58 may be in the shape of a dove tail which mates with a corresponding dove tail groove 60. However, it is understood that various other shapes of member 58 may be utilized with a suitable mating groove within base 52. Further, the groove may be oriented in different directions in base 52. Other types of suitable receiving means may be utilized on vertical member 54.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. A cutting device, comprising:
   a first cutting wheel mounted for rotatable movement having a uniform cutting edge in a single plane;
   a second cutting wheel mounted for rotatable movement having a uniform cutting edge in a single plane and positioned in line with said first cutting wheel and said first and second cutting wheels simultaneously cutting in a same cut line;
   a substantially C-shaped handle structure having a first and a second end with said first wheel mounted to said first end of the C-shaped handle structure and said second cutting wheel mounted to said second end of said C-shaped handle structure;
   a center of said first wheel and a center of said second wheel being spaced a predetermined distance selected to be equal to an amount of travel reduction desired in cutting of a food item to be cut;
   including at least one guard mounted from said C-shaped handle and inwardly directed from said handle over at least one of said first and second cutting wheels;
   said first cutting wheel and said second cutting wheel in use simultaneously cutting said food item; and,
   wherein at least one of said first and second ends of said substantially C-shaped handle structure is inwardly directed.

2. A cutting device in accordance with claim 1 wherein said substantially C-shaped handle structure has sufficient curvature such that fingers of a person utilizing the cutting device would be above the upper most periphery of said first and second cutting wheels.

3. A cutting device in accordance with claim 1 wherein said food item is a pizza and the cutting device is adapted to be positioned with said first cutting wheel in a center of the pizza and said second cutting wheel at an edge of the pizza wherein a complete cut of the pizza may be made by moving the cutting device one half of a span of the pizza.

4. A cutting device in accordance with claim 1 wherein said substantially C-shaped structure is face down with the center of the C-shaped structure being substantially horizontal wherein pressure may be applied in a downward manner on the handle for the cutting of pizza.

5. A cutting device in accordance with claim 1 in combination with a storage apparatus therefor, said storage apparatus including a base and a removeably mounted container for receiving at least a portion of said first and second cutting wheels.

6. A cutting device in combination with a storage apparatus in accordance with claim 5 wherein said container is provided with at least one projection for slidably mounting in a groove in said base.

7. A cutting device in combination with a storage apparatus in accordance with claim 5 wherein said base is substantially heavier than said container.

8. A cutting device in accordance with claim 1 in combination with a storage apparatus therefor, said storage apparatus including a base and a removeably mounted substantially vertical member having a receiving means for receiving said substantially C-shaped handle.

9. A cutting device in combination with a storage apparatus in accordance with claim 8 wherein said substantially vertical member is mounted to a member which is slidably mountable within a groove formed in said base.

10. A cutting device in combination with a storage apparatus in accordance with claim 9 wherein said base is substantially heavier than said vertical member with said receiving means.

11. A cutting device in accordance with claim 1 wherein said at least one guard is comprised of a first and second guard mounted from said C-shaped handle and inwardly directed from said handle over each of said first and second cutting wheels.

12. A pizza cutter, comprising:
   a first cutting wheel with a first predetermined radius mounted for rotatable movement having a uniform cutting edge in a single plane;
   a second cutting wheel of a second predetermined radius mounted for a rotatable movement having a uniform cutting edge in a single plane and positioned in line with said first cutting wheel with said first and second cutting wheels simultaneously cutting in a single cut line;
   a substantially C-shaped handle structure having a first and a second end and a substantially centrally disposed apex, a center of said first wheel mounted to said first end of said substantially C-shaped handle structure and a center of said second cutting wheel mounted to said second end of said substantially C-shaped handle structure;

said substantially centrally disposed apex of said substantially C-shaped handle being located a predetermined distance beyond said first predetermined radius of said first cutting wheel and said second predetermined radius of said second cutting wheel, said predetermined distance being such that fingers of a person grasping said apex of said handle are above said centers of said first and second cutting wheels;

said center of said first cutting wheel and said center of said second cutting wheel being spaced a second predetermined distance apart;

at least one guard mounted from said substantially C-shaped handle and inwardly directed from said handle over at least one of said first and second cutting wheels;

said first cutting wheel and said second cutting wheel simultaneously cutting a pizza; and wherein at least one of said first and second ends of said substantially C-shaped handle structure is inwardly directed.

13. A pizza cutter in accordance with claim 12 wherein said second predetermined distance is selected as an amount of travel reduction desired in cutting of a pizza.

14. A pizza cutter in accordance with claim 12 wherein said first predetermined radius of said first wheel and said second predetermined radius of said second cutting wheel are equal.

15. A cutting device, comprising:

a first cutting wheel mounted for rotatable movement;

a second cutting wheel mounted for rotatable movement;

a substantially C-shaped handle structure having a first and a second end with said first cutting wheel mounted to said first end of the C-shaped handle structure and said second cutting wheel mounted to second end of said C-shaped handle structure;

a center of said first wheel and a center of said second wheel being spaced a predetermined distance selected to be equal to an amount of travel reduction desired in cutting of a food item to be cut;

a guard structure mounted over each said cutting wheel extending from said C-shaped handle and inwardly directed from said handle over each of said first and second cutting wheels;

said C-shaped handle structure having a curvature such that a central portion of said C-shaped handle between said ends is sufficiently above the guards that the fingers of a person doing cutting will be above said centers of said first and second cutting wheels; and said first cutting wheel and said second cutting wheel simultaneously cutting said food item; and wherein at least one of said first and second ends of said substantially C-shaped handle structure is inwardly directed.

16. A cutting device in accordance with claim 15 wherein said food item is a pizza and the cutting device is adapted to be positioned with said first cutting wheel in the center of the pizza and said second cutting wheel at an edge of the pizza wherein a complete cut of the pizza may be made by moving the cutting device one half of a span of the pizza.

* * * * *